Dec. 24, 1929.　　　　　E. H. REMDE　　　　　1,740,712
　　　　　　　　　　INDUSTRIAL TRUCK
　　　　　　　　Filed July 4, 1924　　　4 Sheets-Sheet 1
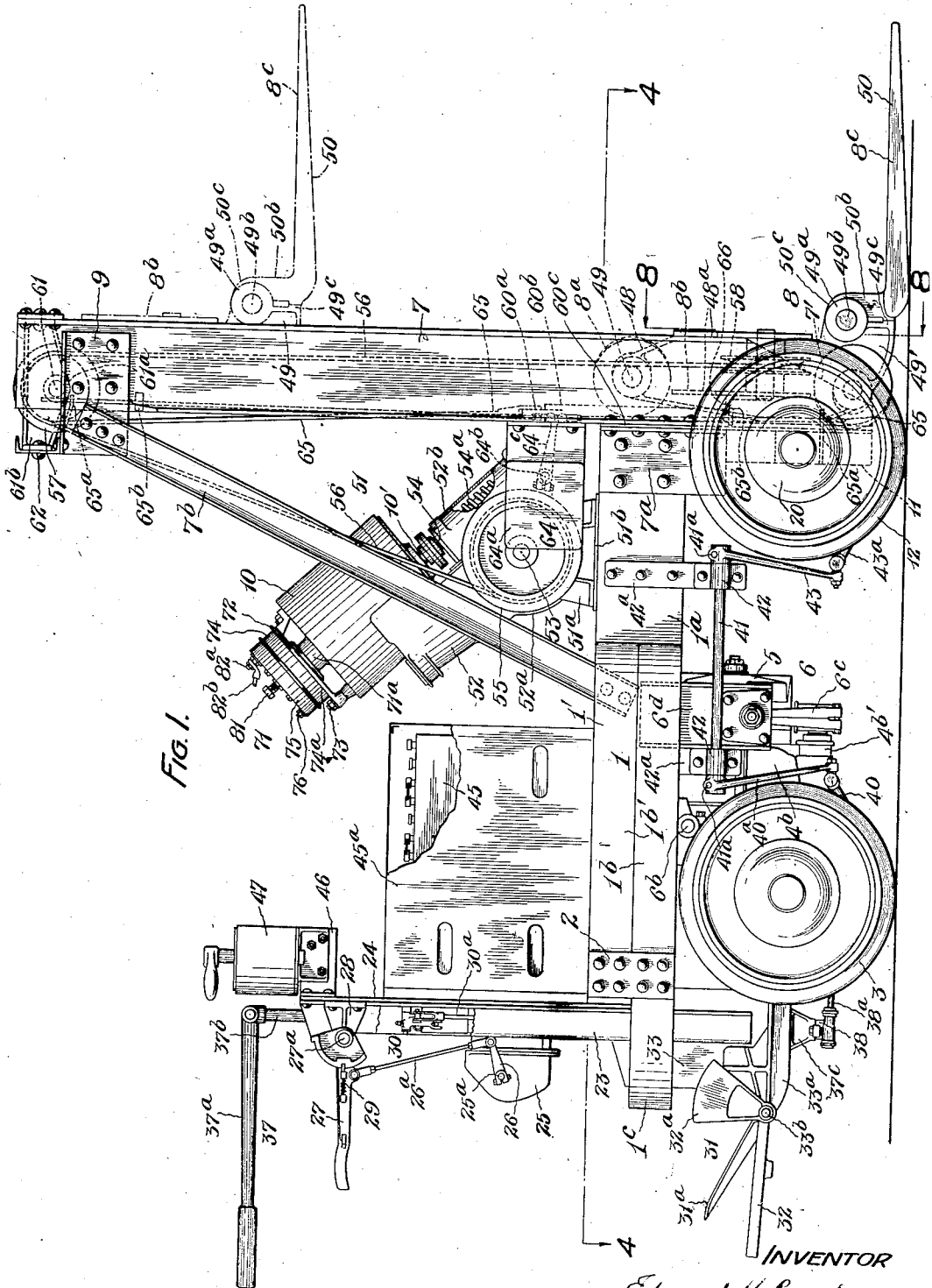
INVENTOR
Edward H. Remde
BY Edward R. Alexander
　　　ATTORNEY.

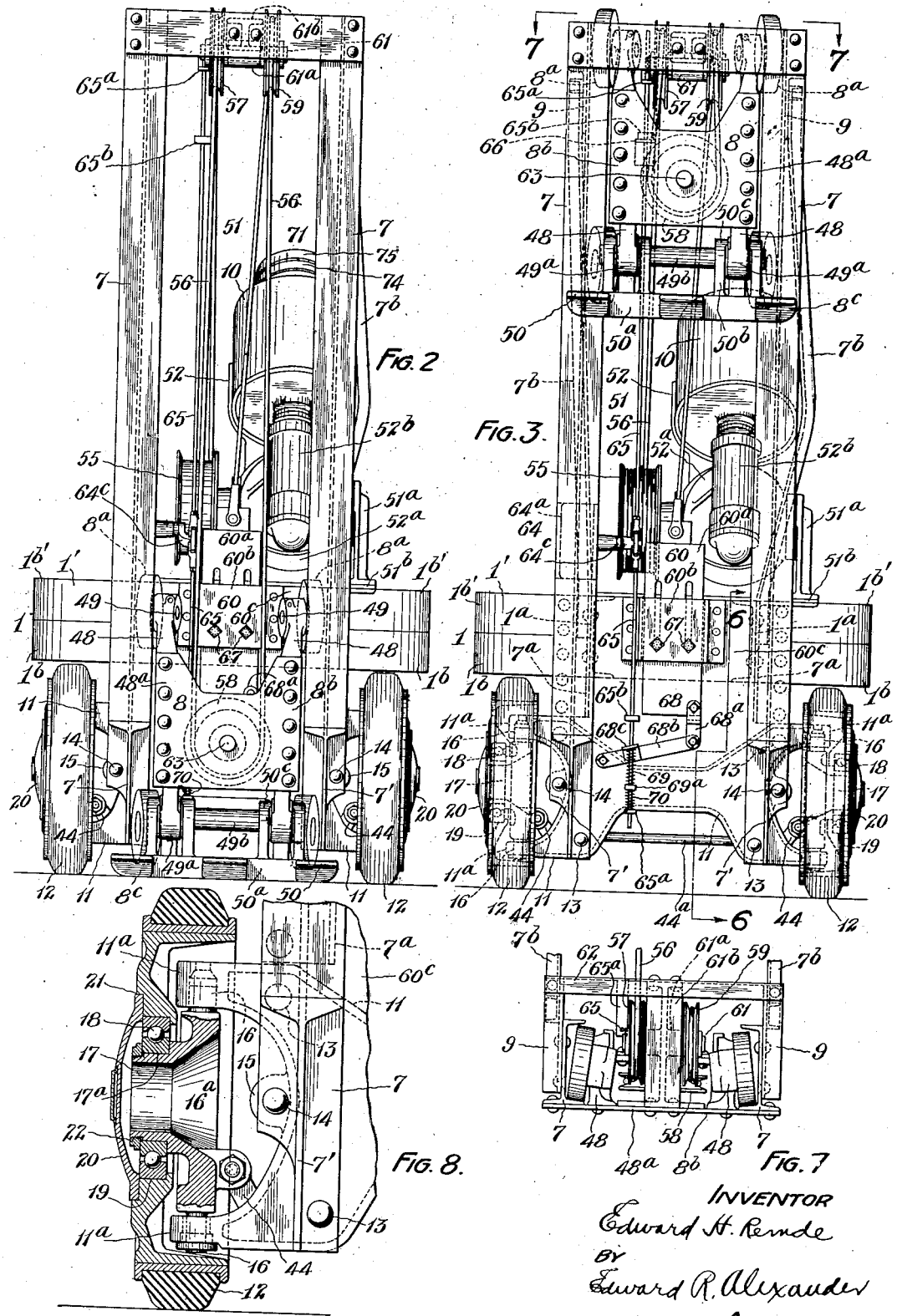

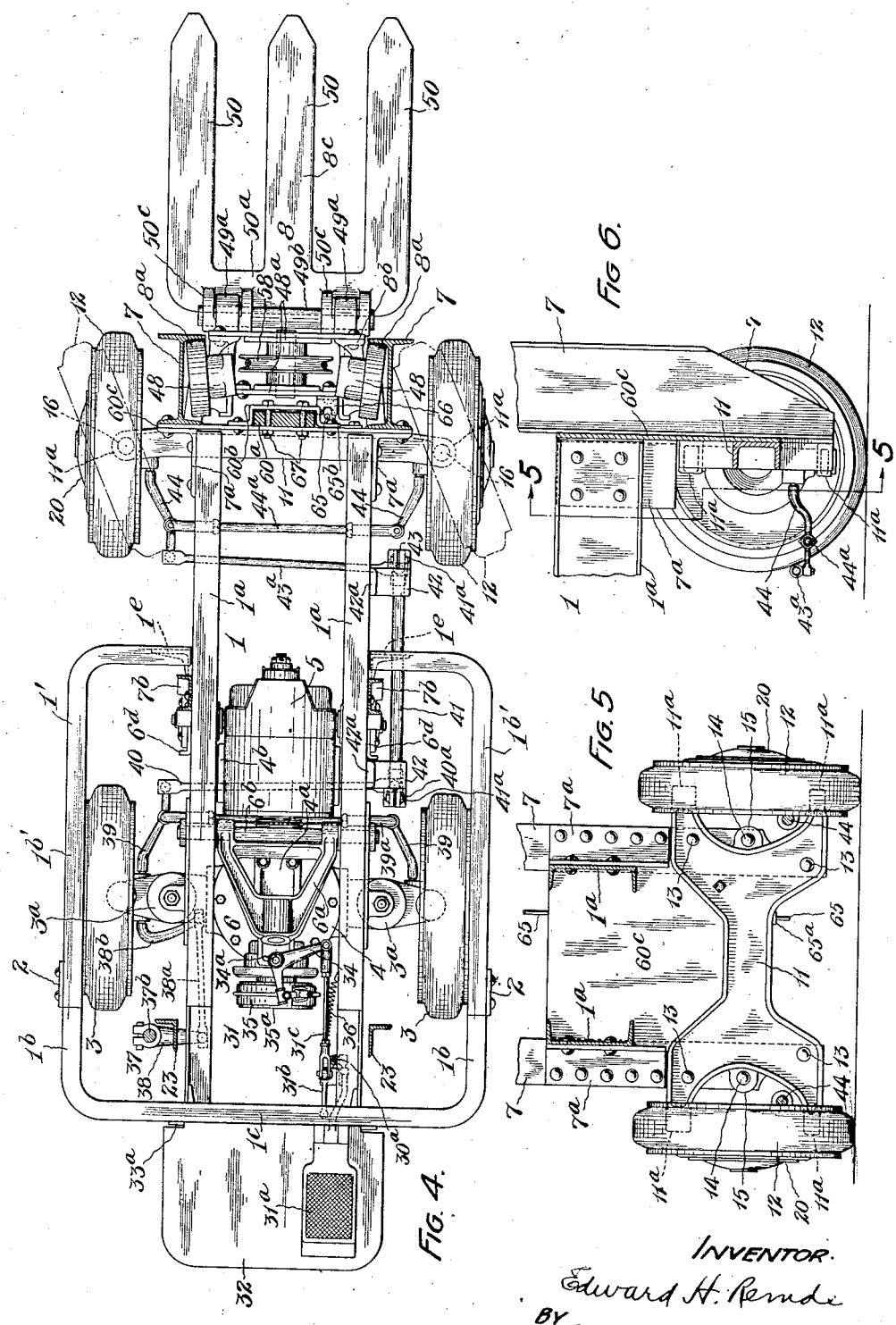

Dec. 24, 1929.　　　　E. H. REMDE　　　　1,740,712
INDUSTRIAL TRUCK
Filed July 4, 1924　　　4 Sheets-Sheet 4
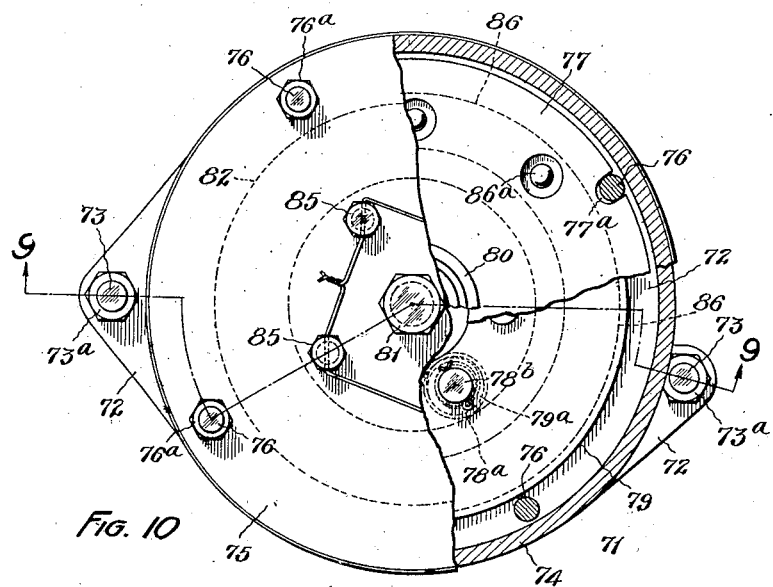
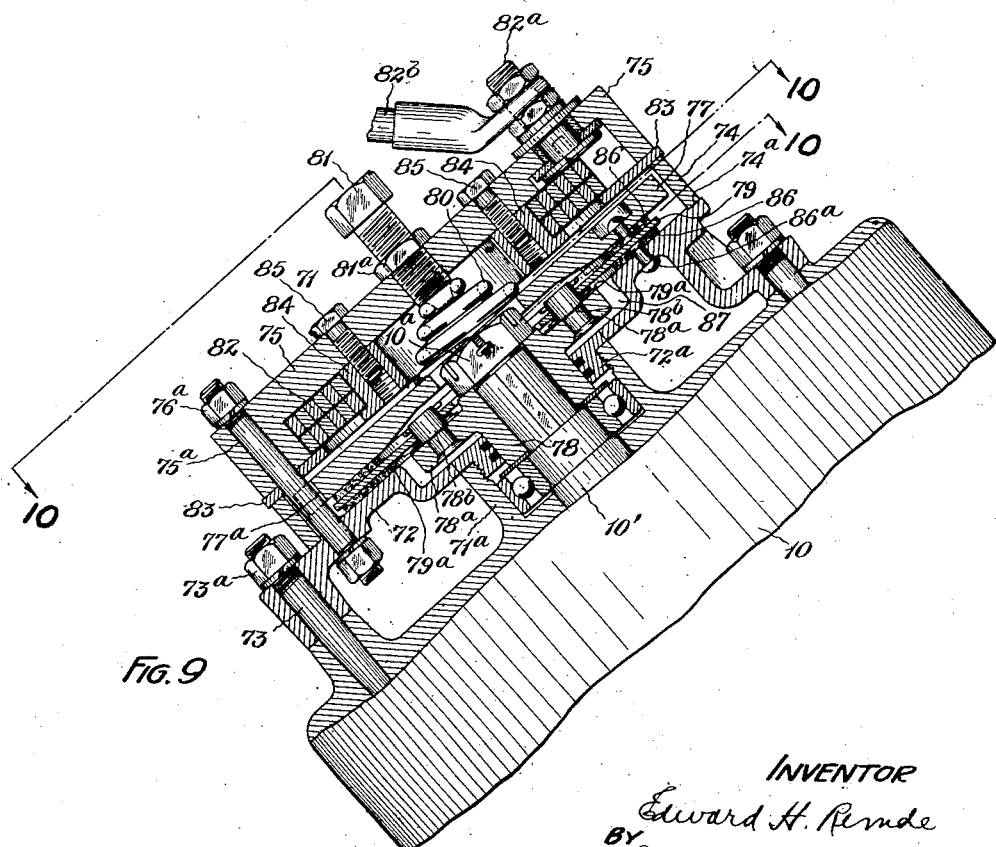
INVENTOR
Edward H. Remde
BY Edward R. Alexander
ATTORNEY.

Patented Dec. 24, 1929

1,740,712

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed July 4, 1924. Serial No. 724,175.

This invention relates to an industrial truck capable of engaging, lifting, transporting and loading and unloading goods, bodies and sheet material.

One object of the invention is to provide a truck of this character that is relatively simple in construction but durable and efficient in operation.

Another object of the invention is to provide an improved construction in which the trailing wheels may be disposed in line with the traction wheels and at the same time provide ample room for the swinging of the trailing wheels for steering purposes.

Another object of the invention is to provide a relatively simple mounting for the trailing wheels whereby the cost of manufacture and assembly is reduced.

Another object of the invention is to provide an improved braking or retarding means for one of the motors arranged to operate automatically.

Other objects of the invention will be apparent to those skilled in the art to which my invention relates from the following description taken in connection with the accompanying drawings.

Fig. 1 is a side elevation of a truck embodying my invention, parts being broken away to facilitate the illustration.

Fig. 2 is an end elevation looking toward the left of Fig. 1.

Fig. 3 is a view similar to Fig. 2, but showing the elevating member in raised position.

Fig. 4 is a plan view of the truck.

Fig. 5 is a section on the line 5—5 of Fig. 6.

Fig. 6 is a fragmentary section on the line 6—6 of Fig. 3.

Fig. 7 is a plan view on the line 7—7 of Fig. 3.

Fig. 8 is a fragmentary section on the line 8—8 of Fig. 1.

Fig. 9 is a section on the line 9—9 of Fig. 10.

Fig. 10 is view partly in plan and partly in section on the line 10—10 of Fig. 9.

In the drawings, 1 indicates as an entirety a frame of any desirable construction, but preferably comprising a pair of spaced longitudinal members $1^a$, $1^a$, and lateral frames $1^b$, $1^b$, formed of U-shape members connected at their front ends by a bar $1^c$. By preference, I provide a supplemental frame $1'$ which rests on the frame 1, preferably comprising lateral L-shaped members $1^{b'}$, $1^{b'}$, each aligned with corresponding elements of the frame 1, so as to be supported thereby. Each of the frame members $1^a$, $1^b$, $1^c$ and $1^{b'}$ may be formed from channel bars and the members $1^b$, $1^b$, $1^c$, are preferably formed from a single section of channel bar, the opposite ends of which are connected to the channel bars $1^a$ by angle plates $1^e$ (see Fig. 4). The frame members $1^b$ and $1^{b'}$ may be connected together by plates 2, secured thereto by rivets, or other suitable means.

3 indicates a pair of traction wheels, preferably mounted on knuckles $3^a$, whereby the wheels may be turned for steering purposes. As shown in Fig. 4, the frame members $1^b$, $1^{b'}$, extend laterally beyond the wheels 3 to form a guard to protect them. 4 indicates the axle casing for an axle mechanism, which may be of any well known construction, connected with the spindles for the wheels 3, whereby they are driven. The casing 4 includes a supplemental casing $4^a$ for a propeller shaft, which is connected in any desired manner to the armature shaft of an electric motor 5, and a cradle $4^b$, to which the motor is rigidly connected. 6 indicates as an entirety a suspension mechanism for the motor 5 and axle casings 4, $4^a$, and cradle $4^b$, such mechanism including an element $6^a$ pivoted to the supplemental casing $4^a$ and a transverse rod or shaft $6^b$ supported by the longitudinal frame member $1^a$ (see Fig. 4) and an element $6^c$ pivoted to the extended end $4^{b'}$ of the cradle $4^b$ and to a pair of plates $6^d$ depending from the frame members $1^a$. As this suspension mechanism forms the subject-matter of a co-pending application (see Letters Patent No. 1,628,145), no claim is made thereto in this application and for the same reason further description herein will not be necessary.

7 indicates a pair of spaced, vertically arranged members, preferably comprising I- beams, disposed at and connected to that end of the frame 1 remote from the lateral frame members 1ᵇ, 1ᵇ′. The I-beams 7 form guides for an elevating member (indicated as an entirety at 8), to which reference will later be made. The guides 7 extend downwardly below the frame 1 to permit lowering of the elevating member 8 into engagement with or relatively close to the floor, as shown in Fig. 1. The guides 7 extend upwardly to any desired height, depending upon the conditions to be met with in the operation of the truck. The guides 7 are rigidly connected to the frame 1 by a pair of angle plates 7ª, the walls of which are riveted or otherwise secured to the end walls of the guides and the channel bars 1ª, and a pair of tie bars 7ᵇ of channel shape in cross section preferably connected at their lower ends to the frame members 1ᵇ′ and at their upper ends to the extended ends of brackets 9 secured to and extending inwardly from the upper ends of the guides 7. Due to the placement of the motor 10 for the elevating member 8 toward one side of the frame 1, one of the tie bars is bent laterally between its ends, as shown in Figs. 2 and 3.

11 indicates a transverse member secured to the inner side walls of the I-beams 7 below their connection with frame 1 and extending laterally beyond the guides 7 to form an axle for a pair of trailing or supporting wheels 12. The transverse member 11 may be cast or otherwise formed. The axle 11 is secured to the inner side walls of the guides 7 by bolts 13 and by bolts 14 connecting lugs 15 (formed integrally with the axle 11) to the flanges or side walls of the beams, or by welding. The opposite ends of the axle 11 are preferably fashioned or shaped to form knuckles 11ª to receive the pintles 16 of the wheel spindles 16ª for the wheels 12 (see Fig. 8), whereby the latter may be operated for steering purposes. The outer end 17 of each spindle 16ª is formed with an annular recess 17ª forming a seat for the inner race of an anti-friction bearing 18, the outer race thereof being seated in an annular recess 19 formed in the hub portion of the adjacent wheel 12. 20 indicates a cap for closing the outer end of the wheel hub and spindle 16ª, the perimeter of the cap fitting a recess 21 formed in the face of the hub and movably secured in such position in any desired manner. As shown in Fig. 8, the inner face of the cap overlaps the outer bearing 18 so as to maintain it in its seat 19; and the inner race of the bearing is engaged by a collar or nut 22 screw threaded on the outer or free end 17 of the spindle 16ª.

In the arrangement above described, it will be noted that (1) the axes of the wheels 12 are positioned at the extreme load handling end of the frame, being substantially in line with the central longitudinal plane between the guide walls or flanges of the guides 7 so that the weight of the load is carried substantially directly by these wheels and necessity for counterweighting the opposite end of the frame is avoided; (2) wheels corresponding in size to the traction wheel 3 may be readily used, thereby permitting of standardization of these wheels and their interchangeability for repair purposes; and (3) the wheels 12 may be disposed in alignment with the wheels 3, so that the over-all width of the truck will not exceed that of the traction wheels or the lateral frame members 1ᵇ, 1ᵇ′, making it possible to operate the truck with relatively great facility. It will also be seen that the trailing wheels are supported in a relatively simple manner and that the guides 7 can be spaced relatively far apart since the chamber or space between the side walls of the I-beams may be utilized to receive the wheels 12 when turned for steering purposes (see dotted lines in Fig. 1). To insure ample space and room for the swinging of the wheels 12, the guides 7 are beveled or cut away as shown at 7′.

This cut-away will not affect the operation of the elevating member 8 since the upper pair of shoes 8ª which engage the front side walls, do not move downwardly to the cut-away portion when the elevating member is in its lowermost position (see Fig. 4).

23 indicates a pair of angle bars fixed to the frame 1 and extending upwardly and downwardly relative thereto. 24 indicates a dash supported by the angle bars. 25 indicates a controller for controlling the supply of current to the motor 5. The operating shaft 25ª of the controller is connected to a lever 26; the lever 26 is connected by a rod 26ª to a handle 27, pivoted at 27ª upon a bracket 28 that is supported by the dash 24. 29 indicates a trigger mechanism for locking the handle 27 in various positions.

30 indicates as an entirety a cut-out or automatic switch inter-connected with the controller 25 and a brake mechanism indicated as an entirety at 31 and serving as a safety mechanism to stop operation of the truck in the event the operative for the truck gets off or is thrown off the supporting platform indicated at 32, without first bringing the operating handle into neutral position. The cut-out mechanism is preferably mounted on the dash 24 and its operating mechanism is connected by a rod 30ª to the brake mechanism 31. 33 indicates a pair of plates preferably secured to the depending portions of the angle bars 23 and supporting brackets 33ª in which are mounted the opposite ends of a shaft 33ᵇ pivotally supporting the platform 32, whereby the latter may be swung upwardly when not in use. 32ª indicates a counterbalance for the platform 32.

Of the brake mechanism 31, 31ª indicates a foot pedal fulcrumed on the shaft 33ᵇ and connected by a linkage 31ᵇ with a rod 31ᶜ, which in turn is connected to one arm of a bell-crank 34 pivoted upon a stud shaft 34ª mounted on the axle casing 4. The other arm of the bell crank is connected through suitable links with one end of a brake band 35 adapted to engage and disengage a brake wheel 35ª fixed to the extended end of the propeller shaft driven by the motor 5. The linkage 31ᵇ is so connected with the pedal 31ᵃ and rod 31ᶜ, that the brake band 35 will be applied when the pedal 31ᵃ is raised, as shown in Fig. 1, so that operation of the pedal downwardly will release the brake band 35 from the wheel 35ª. 36 indicates a spring fixed to one of the frame members and to the rod 31ᶜ and normally acting thereon to apply the brake and to elevate the pedal 31ᵉ. Accordingly, movement of the pedal downwardly will put the spring 36 under tension and upon the release of the pedal the spring will effect operation of the rod 31ᶜ and brake band to cause the latter to engage the wheel 35ª.

37 indicates as an entirety steering means for the wheels 3 and 12. Of these means, 37ª indicates a handle pivotally connected to the upper end of a post 37ᵇ. The post 37ᵇ is rotatably mounted in bearings, provided in suitable brackets. At its lower end, the post 37ᵇ carries an arm 38 pivotally connected to one end of a rod 38ª. The opposite end of the rod 38ª is pivotally connected to an arm 38ᵇ, which is fixed to the spindle of the adjacent traction wheel 3. 39 indicates arms projecting inwardly from the spindles for the wheels 3 and connected by a tie rod 39ª. One of the arms 39 is extended and its free end is pivotally connected to one end of a rod 40 extending substantially transversely of the frame 1 and connected at its opposite end to a lever 40ª fixed to a rock shaft 41. The rock shaft 41 is mounted in spaced bearings 42 provided at the lower ends of a pair of strips 42ª secured to and depending from the frame members 1ª. 43 indicates a lever fixedly connected to the rock shaft 41 and pivotally connected to one end of a rod 43ª. The rod 43ª extends substantially transversely of the frame 1 and is pivotally connected at its opposite end to the extended end of an arm 44. The arm 44 is fixed in any desired manner to the spindle 16ª of the adjacent wheel 12 and by means of a tie rod 44ª to the arm 44 of the spindle 16ª of the other wheel 12. As will be understood from the foregoing description, the steering means operate to swing both pairs of wheels simultaneously but in opposite directions and thus enable the truck to be turned in a relatively small area. The arms 40ª and 43 are provided with hollow bosses which fit the rock shaft 41 and are adjustably clamped thereto by suitable devices 41ª. The bosses are disposed on the rock shaft on the outer sides of the bearings 42 and act thereagainst to prevent endwise movement of the shaft.

45 indicates the batteries for supplying current to the motors 5, 10. The batteries are mounted on the frame members 1ª, 1ᵇ′, and preferably near that end of the frame remote from the guides 7 so as to afford mounting space for the motor 10 and the mechanism driven thereby. The batteries 45 are preferably enclosed in a casing 45ª.

46 indicates a bracket mounted on the dash 24 and supporting a controller 47 which controls the supply of current to the motor 10 to drive it in either direction.

The elevating member 8 may be of any desired construction, but by preference it comprises a vertical member 8ᵇ guided between the guides 7 and a horizontal load engaging and lift member 8ᶜ. The vertical member 8ᵇ comprises a pair of spaced castings 48 connected in fixed spaced relation by a pair of plates 48ª, 48ª, the latter being fixed along their lateral edges by rivets to the castings 48. The castings 48 are provided at their upper and lower ends with angularly disposed bosses which support stud shafts 49 in planes parallel to the inclined inner faces of the side walls of the I-beams 7, so that the upper pair of rollers 8ª may engage the front side walls and the lower pair of rollers 8ª may engage the rear side walls and roll face to face therewith with minimum friction. At their lower front edges the castings 48 are provided with extensions 49′ carrying knuckles 49ª, which support a transverse shaft 49ᵇ, and abutments 49ᶜ. The load engaging and lifting member 8ᶜ preferably comprises a plurality of spaced arms 50, connected at their inner ends by a base portion 50ª which is provided with pairs of up-standing elements 50ᵇ carrying pairs of knuckles 50ᶜ through which the shaft 49ᵇ extends to pivotally connect the member 8ᶜ to the vertical member 8ᵇ. The knuckles 50ᶜ are arranged at opposite sides of the knuckles 49ª so as to co-act therewith to prevent lateral movement of the member 8ᶜ on the shaft. By providing the load engaging and lifting member 8ᶜ with upstanding elements 50ᵇ, it will be seen that the arms 50 are supported in a plane below the lower edge of the vertical member 8ᵇ. Accordingly the lifting member 8ᶜ can be moved downwardly into engagement with the floor, if desired and hence accommodate itself to loads that are supported on relatively low skids. This arrangement also permits the abutments 49ᶜ which are engaged by the rear sides of the elements 50ᵇ, to be arranged remote from the axis of the shaft 49ᵇ to limit downward swinging of the lifting member without undue strain on the shaft.

51 indicates as an entirety the mechanism for raising and lowering the elevating member 8 along the guides 7. Of this mechanism, 51ª indicates a pair of spaced standards mounted on a plate 51ᵇ supported on the frame members 1ª between the battery casing 45ª and guides 7. 52 indicates a cradle to which the motor 10 is rigidly secured. The cradle 52 is shaped to provide a casing 52ª for a worm gear keyed to a shaft 53. The side walls of the casing 52$^a$ are constructed in a suitable manner so as to be rigidly connected to the upper ends of the standards 51$^a$ and thus be supported thereby, the construction permitting the cradle 52 to be inclined as shown in Fig. 1. The armature shaft 10' of the motor 10 is connected in any desired manner to a shaft 54 supported in bearings provided in a supplemental casing 52$^b$ which is fixed to the casing 52$^a$. The shaft 54 is provided with a worm 54$^a$ which meshes with the worm gear keyed to the shaft 53 so as to drive the latter. At one end the shaft 53 extends through openings formed in the side wall of the casing 52$^a$ and adjacent standard 51$^a$ and carries a drum 55 on which winds and unwinds a flexible member 56—such as a cable. The cable 56 is connected to the drum 55 in any desired manner and extends therefrom upwardly over or around a sheave 57 supported at the upper end of the guides 7 in the manner to be later set forth. From the sheave 57 the cable extends downwardly to and around a sheave 58, carried by the vertical member 8$^b$, and from the latter sheave the cable 56 extends upwardly to and around a sheave 59 supported at the upper end of the guides 7. From the sheave 59, the cable 56 extends downwardly, its outer or free end being preferably connected to a take-up mechanism indicated as an entirety at 60.

The sheaves 57, 59, are supported on a shaft 61 mounted in bearings 61$^a$ which are provided in a cross member 61$^b$. The cross member 61$^b$ is supported at one end by a plate riveted to the front side walls of the I-beams 7 and at its opposite end by a channel bar 62 supported at its opposite ends on the brackets 9. By this arrangement the sheaves 57, 59, can be arranged relatively close together to bring their outer peripheries in substantial alignment with the peripheral points at which the cable 56 engages and disengages the sheave 58 as it runs therearound. It also leaves the upper ends of the guides unobstructed so that the elevating member 8 can be moved to the extreme upper end of the guides. The sheave 58 is provided with hubs rotatably fitting a transverse shaft 63 supported at its opposite ends by the connecting and spacing plates 48$^a$, the hubs projecting laterally so as to engage the inner faces of these plates to prevent the endwise movement of the sheave on the shaft.

64 indicates as an entirety an automatic means for shutting off current to the motor 10 in the event the elevating member 8 is moved to a predetermined position in either direction. Of these means, 64$^a$ indicates a casing enclosing a switch mechanism having a rock shaft 64$^b$ to which is connected a lever 64$^c$. The lever is connected to rods 65, 65, guided in openings formed in brackets 65$^a$, and carrying adjustable tappets 65$^b$ with either of which the elevating member 8 engages as it moves in either direction, the latter being preferably provided with a projection 66 (see Fig. 1) which engages either tappet and through it operates the switch lever 64$^c$.

The take-up mechanism 60 preferably comprises a weight 60$^a$ to which the outer end of the cable 56 is pivotally connected as shown in Figs. 2 and 3. The weight 60$^a$ is slidably mounted in a guide 60$^b$ that is fixed to a plate 60$^c$ interposed between the rear side walls of the guides 7 and the angle plates 7$^a$, such plate forming the inner guide wall for the weight 60$^a$ (see Fig. 4). 67 indicates a pair of bolts extending through and supported in aligned openings formed in the plate 60$^c$ and guide 60$^b$ and also extending through openings in the weight 60$^a$ and serving to prevent movement thereof upwardly due to the pull on cable 56, by reason of the weight of the elevating member or the load which may be carried thereby. As shown in Figs. 2 and 3, the openings in the weight 60$^a$ for the bolts 67 are elongated, so that in the event the elevating member 8, when moving downwardly becomes wedged or engages an obstruction, thereby causing slack in the cable 56, the elongated openings will permit the weight to gravitate downwardly and thus take up all slack in the cable and prevent it from disengaging any of the sheaves or getting twisted on the drum 55.

68 indicates a connection between the take-up means 60 and the cut-out mechanism 64 for operating the latter when the weight 60$^a$ operates to stop the motor. The connection 68 preferably comprises a link 68$^a$ pivoted to and depending from the weight 60$^a$, a link 68$^b$ pivotally connected at its opposite ends to the link 68$^a$ and a stationary part, for example the axle 11, and carrying a lug 68$^c$ formed with an opening through which the adjacent rod 65 extends and a spring 69 coiled around the rod and interposed between the lug 68$^c$ and a collar 69$^a$ adjustably fixed to the rod. In operation, the movement of the weight 60$^a$ downwardly swings the link 68$^c$ about its pivotal connection with the axle 11; this movement compresses the spring 69 which acts through the collar 69$^a$ to move the rod 65 downwardly and the latter operates the switch cutout mechanism within the casing 64$^a$.

70 indicates a spring coiled around the lower rod 65 and interposed between the adjacent bracket 65$^a$ and collar 69$^a$. When the rod 65 is moved downwardly, either due to the engagement of the elevating member 8 with the lower tappet 65$^b$ or the operation of the link 68$^b$, the spring 70 will be compressed so that upon the movement of the elevating member 8 or link 68$^b$ in the opposite direction, the spring will restore the rod to its normal position.

No claim is made herein to the take-up mechanism or the combination thereof with a limiting means since such subjects-matter are the invention of Amiel G. Hutzley covered by an application filed by him on the 24th day of June, 1924 (see Letters Patent No. 1,690,681).

71 indicates as an entirety a brake mechanism for stopping the shaft of the motor and preventing movement thereof when the current thereto is cut off. Of this mechanism, 71ᵃ indicates a collar extending from the upper end of the motor casing and provided on its inner wall with screw threads. 72 indicates an annular member having an inwardly extending ring 72ᵃ provided with screw threads to engage the screw threads on the collar 71ᵃ near its outer edge. The annular member 72 and an integral depending wall thereof are formed with openings to receive bolt shanks 73 extending from the motor casing, such shanks being screw threaded on their outer ends to take nuts 73ᵃ, whereby the annular member is rigidly clamped to the motor casing.

74 indicates a ring seated in an annular groove 74ᵃ formed in the face of the annular member 72 near its outer edge and serving as a spacing element between the annular member and a casing member 75. The annular member 72 and casing member 75 are formed with pairs of aligned openings 75ᵃ (one pair being shown in Fig. 9) to receive bolts 76 carrying nuts 76ᵃ which—when tightened—clamp the casing member 75 to the annular member 72 with the ring 74 between them. 77 indicates a disk or plate (preferably formed from iron or steel for a reason which will presently appear) disposed between the annular member 72 and casing member 75 and movable toward and from said members. The central portion of the plate is cut-away to receive the adjacent free end of the armature shaft 10′ and the nut 10ᵃ thereon to which reference will later be made. The disk 77 is made of a size and shape to extend radially a distance greater than the distance from the axis of the motor to the securing bolts 76 so that by forming notches 77ᵃ in the edge of the disk the bolts will serve as guides for the disk and prevent it from rotating with the armature shaft 10′. 78 indicates a collar keyed to the extended end of the armature shaft 10′ and having a flange 78ᵃ carrying a plurality of pins 78ᵇ. 79 indicates a relatively thin annular plate having openings to receive the pins 78ᵇ to connect the plate to the flange 78ᵃ to cause it to rotate therewith. The openings in the plate 79 are of a size to permit the plate to move upwardly and downwardly on the pins, which serve as guides therefor, removable devices projecting from the pins preventing the displacement of the plate. 79ᵃ indicates coiled springs surrounding the pins 78ᵇ and disposed between the plate 79 and flange 78ᵃ, the springs being arranged to support the plate substantially midway between the flange and the free ends of the pins so that it may move thereon upwardly and downwardly, the springs tending to return the plate to this position if moved downwardly. 80 indicates a spring, preferably of the coiled type, interposed between the casing member 75 and the plate 77 and normally tending to move the latter toward the annular member 72—that is downwardly—to engage the rotating plate 79 and to press the latter against the annular member 72, thereby causing friction between the rotating disk and the stationary faces of the plate 77 and annular member 72 to prevent rotation of the armature shaft 10′ or to stop the rotation thereof upon cutting off the current to the motor as will be later set forth. The outer end of the spring 80 is preferably engaged by the inner end of a cap screw 81, which is mounted in a screw threaded opening formed in the casing member 75, such cap screw being rotatable, so as to adjust its inner end toward and from the spring 80 so that the tension of the latter may be increased or decreased as desired. The cap screw 81 may be locked in its adjusted position by a nut 81ᵃ. 82 indicates one or more windings mounted within the casing member 75 and adapted to be connected in the motor circuit in series with the motor when the latter is being driven in either direction, such connection being effected by terminals, one of which is shown at 82ᵃ connected to a lead 82ᵇ, forming one of the leads for the motor circuit. As shown, the windings 82 are disposed above the plate 77 and when the circuit to the motor is completed, the windings are energized and attract the plate 77, which constitutes an armature, and causes it to move upwardly against the tension of the spring 80 to release the plate from the rotating disk 79 and permit its disengagement from the annular member 72.

From the foregoing description it will be seen that I have provided a brake which is normally applied to the motor shaft to prevent its rotation and have associated therewith an electromagnet that is connected in series with the motor circuit and operates automatically to release the brake when the motor is started and to permit the application of the brake when the current is cut off, so that the motor cannot continue to run, due to momentum after the circuit is open.

The windings 82 are preferably supported in the casing member 75 by a pair of ring shaped members 83, 84, the former being clamped between the ring 74 and the sidewall of the casing member 75, and the latter being secured to the body portion of the casing member by cap screws 85 extending through screw threaded openings formed therein. As shown in Fig. 9 the annular or ring shaped members 83, 84, engage the inner faces of the windings and support them within the casing member 75. By constructing the annular members 83 and 84 to engage the inner face of the windings 82, I provide an air gap between the windings and the armature 77. To increase the friction between the opposite faces of the rotating plate 79 and opposing faces of the armature 77 and annular member 72, these latter faces may be provided with annular bands 86 of suitable material and secured thereto in any suitable manner, for example, by rivets 86$^a$.

It will also be seen from the foregoing description that the rotating friction plate 79 is normally positioned out of engagement with the annular member 72, so that upon the operation of the electromagnet, the disengagement of the plate from both opposing relatively stationary elements will be immediately effected.

To accommodate the collar 78 and flange 78$^a$, the armature shaft 10' is extended and provided at its free end with screw threads to take the nut 10$^a$ which serves to maintain the collar 78 on the armature shaft, and the annular member 72 is formed with a recess 86 to receive the flange 78$^a$.

To those skilled in the art to which my invention relates many modifications and widely differing embodiments and applications thereof will suggest themselves without departing from the spirit and scope of the invention. My disclosures and the description herein are purely illustrative and are not intended to be in any sense limiting.

What I claim is:

1. In apparatus of the class described, the combination of a frame, a pair of guides for a slidable elevating member, said guides being connected to one end of said frame and extending vertically upwardly and downwardly relative thereto, an axle supported on the rear sides of said guides below said frame and provided with knuckles at its opposite ends, a pair of wheels for the opposite end of the frame, and a pair of wheels mounted on said knuckles, portions of said guides being cut away to permit swinging of the last mentioned wheels.

2. In apparatus of the class described, the combination of a frame, a pair of guides for a slidable elevating member, said guides being fixed to one end of said frame and extending thereabove and therebelow, a pair of traction wheels for the opposite end of said frame, a pair of trailing wheels, an axle connected to and supported by said guides and extending laterally to opposite sides thereof and carrying said trailing wheels at its opposite ends in line with said first mentioned wheels, said trailing wheels being swingably mounted on the outer ends of said axle and the front portion of said guides being cut away to permit swinging of said trailing wheels.

3. In apparatus of the class described, the combination of a frame, a pair of members fixed to one end of said frame and extending thereabove and therebelow, said members having flanges certain of which serve as guides for a slidable elevating member, a pair of supporting wheels for the opposite end of said frame, an axle connected to and supported on the inner sides of said members, the opposite ends of said axle extending beyond said members and provided with knuckles, and a pair of supporting wheels mounted on said knuckles in line with said first-mentioned pair of wheels and arranged to swing into the space between the flanges of said members when the forward portion of either wheel swings inwardly.

4. In apparatus of the class described, the combination of a frame, a pair of members connected to one end of said frame and extending vertically upwardly and downwardly relative thereto, said members having flanges certain of which serve as guides for a slidable elevating device, an axle supported on the inner sides of said members between said frame and the lower free ends of said members, the opposite ends of said axle extending beyond said members and provided with knuckles, a pair of wheels for the opposite end of said frame, a pair of wheels mounted on said knuckles and extending outwardly beyond the sides of said members, said members and knuckles being so related that the forward portion of each wheel swings into the space between the flanges of the adjacent member when moved inwardly and the lower portion of each member being cut away to permit maximum swinging movement of the adjacent wheel.

In testimony whereof, I have hereunto subscribed my name.

EDWARD H. REMDE.